United States Patent [19]

Brashear, Jr. et al.

[11] 4,119,472

[45] Oct. 10, 1978

[54] REBONDED FUSION-CAST AZS REFRACTORY GRAIN

[75] Inventors: Otto S. Brashear, Jr.; Clifford L. Hund, both of Louisville, Ky.; Thomas M. Wehrenberg, Jeffersonville, Ind.

[73] Assignee: Corning Glass Works, Corning, N.Y.

[21] Appl. No.: 719,364

[22] Filed: Sep. 1, 1976

[51] Int. Cl.$^2$ .................. C04B 35/48; C04B 35/14
[52] U.S. Cl. ........................................... 106/57
[58] Field of Search ................................. 106/57

[56] References Cited

U.S. PATENT DOCUMENTS

| | | | |
|---|---|---|---|
| 3,519,448 | 7/1970 | Alper et al. | 106/57 |
| 3,567,473 | 3/1971 | Drever et al. | 106/57 |
| 3,632,359 | 1/1972 | Alper et al. | 106/57 |
| 3,754,950 | 8/1973 | Cevales | 106/57 |
| 3,782,980 | 1/1974 | Smith | 106/57 |
| 3,837,870 | 9/1974 | Recasens et al. | 106/57 |
| 3,846,145 | 11/1974 | Rondabush | 106/57 |
| 3,972,722 | 8/1976 | Holt et al. | 106/57 |
| 3,992,213 | 11/1976 | Desouches et al. | 106/57 |

FOREIGN PATENT DOCUMENTS 30-2,990  4/1955  Japan ........................................ 106/57

*Primary Examiner*—Winston A. Douglas
*Assistant Examiner*—Mark Bell

*Attorney, Agent, or Firm*—Richard N. Wardell; Clarence R. Patty, Jr.

[57] ABSTRACT

Fired refractory articles are made of a shaped refractory composition predominantly comprising grain of fusion-cast AZS refractory having: (i) a three-phase microstructure of interlocking crystals of corundum (alpha alumina) phase and baddeleyite (zirconia) phase with intercrystalline glassy phase therebetween, the glassy phase being about 15–30 vol.% of the AZS refractory, and (ii) an oxide analysis consisting of 35–60 wt.% $Al_2O_3$ plus $Cr_2O_3$ with $Cr_2O_3 \leq 60$ wt.% of $Al_2O_3$ plus $Cr_2O_3$, 25–50 wt.% $ZrO_2$, 10–18 wt.% $SiO_2$, 0.8–1.8 wt.% $Na_2O$ plus $K_2O$, and up to 0.7 wt.% other ingredients (e.g. impurities). Refractory composition consists of: (A) 25–60 wt.% fusion-cast AZS refractory coarse grain being at least 89 wt.% $-6+20$ Tyler mesh, (B) 0–38 wt.% fusion-cast AZS refractory medium grain being at least 73 wt.% $-10+35$ Tyler mesh, and (C) 30–50 wt.% at least one component selected from the group consisting of: (1) 0–50 wt.% fusion-cast AZS refractory fine grain being at least 60 wt.% $-35+325$ Tyler mesh and (2) 0–30 wt.% at least one constituent selected from the group consisting of: (a) alumina being at least 90 wt.% $-325$ Tyler mesh, at least 98.5 wt.% $Al_2O_3$ and not more than 0.5 wt.% $Na_2O$, and (b) $-325$ Tyler mesh chromic oxide being at least 95 wt.% $Cr_2O_3$, and (D) 0–7 wt.% colloidal silica.

10 Claims, No Drawings

REBONDED FUSION-CAST AZS REFRACTORY GRAIN

BACKGROUND

The field of the invention relates to refractory compositions for sintered refractory articles formed with predominantly grain of fused AZS (alumina-zirconia-silica) material, particularly fusion-cast AZS refractory solidified and cooled as a unitary mass or block in a relatively slow manner and thereafter crushed into grain to be rebonded.

The general concept of rebonding crushed fused AZS grain was apparently first disclosed in U.S. Pat. Nos. 1,240,490 and 1,240,491. The rebonding was to be accomplished by ordinary ceramic bonds (cf. the clay-flux bond in U.S. Pat. No. 930,376). For refractories, it was noted that the fused AZS composition could contain zirconia up to equimolecular proportion with alumina (ca. 54.7 wt.% $ZrO_2$ and 45.3 wt.% $Al_2O_3$ when ignoring impurities).

A somewhat similar teaching is presented in U.S. Pat. No. 1,324,546 although the composition of the fused AZS grain apparently includes a substantial amount of MgO. Besides the fused grain and clay-flux bond, it is noted that finely ground unfused materials of the same composition as the fused grain may also be added. The refractory products are said to have resistance to corrosive and erosive action of molten material (e.g. molten metals or glass) in contact therewith, to deformation at high temperature and to cracking during changes of temperature.

It was later recognized that the clay-flux bonds of those early rebonded fused AZS grain refractories significantly limited refractoriness and resistance to chemical action. As a result, efforts were made, as noted in U.K. Pat. Nos. 605,215 and 610,334, to form rebonded refractories solely of fused AZS grain, initially with normal fusion-cast material and then with rapidly cooled grain formed by dispersing a melt into droplets, or of fused AZS grain combined with another fused grain where the glassy phase of one was more refractory than the glassy phase of the other. However, no apparent special effort was made to control particle sizing other than to provide a mixture of granules and fine particles.

In more recent times, several particular compositions have been developed for producing refractory articles with rebonded fused AZS grain for resisting contact action of molten materials and thermal shock. Each one requires a different special combination of materials for proper attainment of suitable properties. U.S. Pat. No. 3,567,473 prescribes mixing certain fused AZS grain with either tabular alumina plus alpha quartz or kyanite as well as with calcined alumina, magnesium oxide and colloidal silica, each in particular proportions. U.S. Pat. No. 3,782,980 prescribes mixing certain fused AZS grain with an essential proportioned combination of zircon (or zirconia) and alumina. U.K. Pat. No. 1,429,723 prescribes combining certain fused AZS grain with alumina and/or mullite together with some silica binder. U.S. Pat. No. 3,846,145 prescribes certain fused AZS grain to be combined with kyanite, zircon, calcined alumina, chromic oxide and silica.

It has also been proposed in U.K. Pat. No. 1,254,792 to provide a binder (or mortar) of fusion-cast AZS grain mixed with either hydraulically setting cement, expanded clay or chemical binder to join relatively small fusion-cast slabs together to form a composite refractory block.

None of these prior art rebonding compositions are seen to comprehend the unique balanced combination refractory composition of the invention disclosed and claimed herein, which is believed to provide superior properties to those of these prior art compositions.

SUMMARY OF THE INVENTION

The invention is a refractory composition for making refractory articles and the fired refractory article made of such refractory composition. Such fired article, vis a vis present competitive prior art bonded refractories, is characterized by superior resistance to corrosion by molten glass and alkali in contact therewith and by superior flexure strength (i.e. modulus of rupture or MOR) at room temperature before and, in many cases, after substantial thermal cycling. The fired article of this invention is also characterized by good thermal shock resistance and other properties which will be apparent from the following disclosure herein.

The unique balanced combination refractory composition is provided with grain of fusion-cast AZS refractory having an important substantial volume amount of glassy phase that undergoes solid state reaction with other ingredients of the composition during firing thereof to yield formation of substantial mullite phase, within both the fusion-cast grains themselves and the glassy matrix bonding them together, and reduced glassy phase, which is believed to contribute substantially to the attainment of the improved properties. Such glassy phase in the fusion-cast AZS refractory results mainly from properly balanced amounts of $SiO_2$, $Al_2O_3$, $Na_2O$, $K_2O$ and other ingredients (e.g. impurities) residing in the glassy phase. Also importantly contributing to the improved fired product properties, as part of the unique balanced combination, is the controlled grain or particle sizing and the controlled combination of materials in the refractory composition.

In its broadest aspect, the refractory composition consists of:

(A) 25-60 wt.% fusion-cast AZS refractory coarse grain being at least 89 wt.% −6+20 Tyler mesh, (B) 0-38 wt.% fusion-cast AZS refractory medium grain being at least 73 wt.% −10+35 Tyler mesh, and (C) 30-50 wt.% at least one component selected from the group consisting of (1) 0-50 wt.% fusion-cast AZS refractory fine grain being at least 60 wt.% −35+325 Tyler mesh, and (2) 0-30 wt.% at least one constituent selected from the group consisting of (a) alumina being at least 90 wt.% −325 Tyler mesh, at least 98.5 wt.% $Al_2O_3$ and not more than 0.5 wt.% $Na_2O$, and (b) −325 Tyler mesh chromic oxide being at least 95 wt.% $Cr_2O_3$.

The fusion-cast AZS refractory of the grains in the refractory composition has a three-phase microstructure of interlocking crystals of corundum (alpha alumina) phase and baddeleyite (zirconia) phase with intercrystalline glassy phase therebetween. The glassy phase is about 15-30 (preferably 20-30) volume % of the fusion-cast AZS refractory. The oxide analysis of the fusion-cast AZS refractory consists of (in wt.%):

| Range | $Al_2O_3$ +$Cr_2O_3$ | $ZrO_2$ | $SiO_2$ | $Na_2O+K_2O$ | Other Ingredients |
|---|---|---|---|---|---|
| Broad | 35–60 | 25–50 | 10–18 | 0.8–1.8 | up to 0.7 |
| Preferred | 40–55 | 30–45 | 10–16 | 1.0–1.6 | up to 0.5 | with the $Cr_2O_3$ being equal to or less than 60 wt.% (preferably 50 wt.%) of $Al_2O_3$ plus $Cr_2O_3$. Based on present economic reasons, it is preferred to omit $Cr_2O_3$. A particular desired fusion-cast AZS refractory has an oxide analysis consisting of 45–50 wt.% $Al_2O_3$, 33–41 wt.% $ZrO_2$, 12–16 wt.% $SiO_2$, 1.1–1.5 wt.% $Na_2O$ and up to 0.3 wt.% other ingredients.

The fired refractory article made of the above-described refractory composition has a four-phase microstructure of corundum, baddeleyite, mullite and glassy phase with the mullite being about 5–25 wt.% (preferably 8–22 wt.%) thereof and the glassy phase being about 5–20 volume % (preferably 5–17 volume %) thereof.

As used herein, corundum phase includes the corundumtype phase of $Cr_2O_3$ in solid solution with $Al_2O_3$.

For making pressed refractory shapes, an especially desired modification of the foregoing refractory composition has:

(A) the coarse grain being 33–37 wt.%,
(B) the medium grain being 20–25 wt.%, and
(C) the at least one component being 40–45 wt.% selected from the group consisting of
  (1) 15–45 wt.% the fine grain and
  (2) 0–30 wt.% the at least one constituent selected from the group consisting of
    (a) the alumina which is at least 98.5 wt.% $Al_2O_3$ and
    (b) the chromic oxide which is at least 95 wt.% $Cr_2O_3$.

For making cast refractory shapes, the broadly described refractory composition is desirably modified so as to have:

(A) the coarse grain being 33–37 wt.%,
(B) the medium grain being 32–37 wt.%, and
(C) the at least one component being 30–35 wt.% selected from the group consisting of
  (1) 0–25 wt.% the fine grain and
  (2) 10–30 wt.% the at lest one constituent selected from the group consisting of
    (a) the alumina which is at least 98.5 wt.% $Al_2O_3$, and
    (b) the chromic oxide which is at least 95 wt.% $Cr_2O_3$.

DESCRIPTION OF THE PREFERRED EMBODIMENTS

Two different fusion-cast AZS refractories were employed in the crushed and screened form of grain in manufacturing fired refractory articles according to this invention. The chemistry and structure of those two fusion-cast AZS refractories were as follows:

| | AZS-1 | AZS-2 |
|---|---|---|
| $Al_2O_3$ wt. % | 49.6 | 45.4 |
| $ZrO_2$ wt. % | 33.5 | 40.4 |
| $SiO_2$ wt. % | 15.2 | 12.9 |
| $Na_2O$ wt. % | 1.5 | 1.1 |
| $Fe_2O_3$ wt. % | 0.1 | 0.1 |
| $TiO_2$ wt. % | 0.1 | 0.1 |
| Glassy Phase wt. % | 15–20 | 13–18 |
| Glassy Phase vol. % | 20–30 | 20–30 |
| Crystal Phases | Corundum | Corundum |
| | Baddeleyite | Baddeleyite |

Each of the two fusion-cast AZS refractories were crushed and screened such that:

(1) the coarse grain had a cumulative particle size distribution as follows:

| Tyler Mesh No. | Particle Size (microns) | Cumulative percent by weight left on screen | |
|---|---|---|---|
| | | Maximum | Minimum |
| 6 | 3327 | 0 | 0 |
| 8 | 2362 | 32 | 12 |
| 10 | 1651 | 89 | 69 |
| 12 | 1387 | 99 | 84 |
| 20 | 833 | 99 | 89 |

(2) the medium grain had a cumulative particle size distribution as follows:

| Tyler Mesh No. | Particle Size (microns) | Cumulative percent by weight left on screen | |
|---|---|---|---|
| | | Maximum | Minimum |
| 10 | 1651 | 0 | 0 |
| 14 | 1168 | 30 | 10 |
| 20 | 833 | 56 | 36 |
| 28 | 590 | 75 | 55 |
| 35 | 417 | 93 | 73 | and
(3) the fine grain has a cumulative particle size distribution as follows:

| Tyler Mesh No. | Particle Size (microns) | Cumulative percent by weight left on screen | |
|---|---|---|---|
| | | Maximum | Minimum |
| 35 | 417 | 0 | 0 |
| 65 | 208 | 43 | 23 |
| 100 | 147 | 54 | 34 |
| 150 | 105 | 63 | 43 |
| 200 | 74 | 71 | 51 |
| 250 | 62 | 73 | 53 |
| 325 | 44 | 80 | 60 |

The alumina employed was ground to 95 wt.% −325 Tyler mesh and had the following typical chemistry (in wt.%): 99.2% $Al_2O_3$, 0.45% $Na_2O$, 0.04% $Fe_2O_3$, 0.02% $SiO_2$ and 0.3% loss on ignition. However, lesser purity, low $Na_2O$ aluminas may also be used.

The chromic oxide employed was all −325 Tyler mesh of about 98 wt.% $Cr_2O_3$ pigment grade. However, lesser purity chromic oxide (e.g. metallurgical grade) may also be used.

EXAMPLE 1

A series of pressed and fired shapes having refractory compositions as set forth in Table 1 were prepared by mixing those compositions with suitable organic lubricant-binder (such as 0–0.3 wt.% water soluble polyethylene glycol wax and 1.75–3 wt.% lignin sulfite binder), forming the mixtures by hand ramming or mechanical pressing into shapes ranging from 5 lbs. brick to 1000 lbs. complicated shapes and thereafter firing the green shapes at 1500°–1700° C. for at least about six hours to develop ceramic bonding.

Similar fired properties are attainable by substitution of AZS-2 grain for the AZS-1 grain in the samples as shown in Table 1.

TABLE 1

| Refractory Composition Component | Sample Composition - Wt. % | | | | | | |
|---|---|---|---|---|---|---|---|
| | A | B | C | D | E | F | G |
| Coarse AZS-1 grain | 35 | 35 | 35 | 35 | 35 | 35 | 35 |
| Medium AZS-1 grain | 25 | 25 | 25 | 20 | 20 | 20 | 25 |
| Fine AZS-1 grain | 15 | 20 | 25 | 35 | 40 | 45 | 10 |
| Alumina | 25 | 20 | 15 | 10 | 5 | — | 15 |
| Chromic Oxide | — | — | — | — | — | — | 15 |
| 1600° C. Fired Properties | | | | | | | |
| Apparent Porosity - vol. % | 16.1 | 16.7 | 14.5 | 15.5 | 16.3 | 17.5 | 17.0 |
| Bulk Density - gms/cc. | 3.16 | 3.16 | 3.17 | 3.17 | 3.14 | 3.11 | 3.16 |
| Bulk Density - lbs./ft$^3$ | 197 | 197 | 198 | 198 | 196 | 194 | 197 |
| MOR at Room Temp. - psi | 6100 | 5950 | 5900 | 6500 | 6750 | 5200 | 5600 |
| MOR at 1340° C. - psi | 1300 | 1200 | 1500 | 1500 | 1550 | 1100 | 1425 |
| Thermal Shock Cycles - room temp. to 1400° C. and return to room temp. | 20+ | 20+ | 20+ | 20+ | 20+ | 20+ | 20+ |
| MOR at Room Temp. after thermal Shock Cycling - psi. | 3400 | 2650 | 1050 | 1400 | 1150 | 1600 | 900 |
| Apparent Porosity - vol. % | 13 | 12 | 12.5 | 12 | 13 | 15 | 13 |
| Bulk Density - gms/cc. | 3.14 | 3.16 | 3.20 | 3.12 | 3.11 | 3.11 | 3.17 |
| Bulk Density - lbs/ft.$^3$ | 196 | 197 | 200 | 195 | 194 | 194 | 198 |
| MOR at Room Temp. - psi | 8000 | 8350 | 7800 | 9350 | 8500 | 6950 | 6200 |
| MOR at 1340° C. - psi | 800 | 900 | 950 | 1160 | 1150 | 1075 | 1300 |
| Thermal Shock Cycles - room temp. to 1400° C. and return to room temp. | 20+ | 20+ | 20+ | 20+ | 20+ | 20+ | 20+ |
| MOR at Room Temp. after thermal Shock Cycling - psi. | 1450 | 1500 | 1300 | 650 | 1100 | 1200 | 1050 |

For comparison, the following properties were obtained from a commercially available, competitive bonded AZS refractory with substantially identical oxide analysis like and believed to be that described in Canadian Pat. No. 754,627 as example #2 in Table I on page 8 thereof:

| | |
|---|---|
| Apparent Porosity-vol.% | 17.1 |
| Bulk Density-gms./cc. | 3.16 |
| Bulk Density-lbs./ft.$^3$ | 197 |
| MOR at Room Temp.-psi | 1500 |
| MOR at 1340° C.-psi | 750 |
| Thermal Shock Cycles-Room Temp. to 1400° C. to Room Temp. | 20+ |
| MOR at Room Temp. after Thermal Shock Cycling-psi | 1100 |

The notation of 20+ for thermal shock cycles means that no failure had yet occurred after 20 cycles.

Performance of pressed and fired refractory bodies of this invention in contact with common soda-lime and borosilicate glasses is illustrated by the comparative standard test results shown in Table 2 for Sample C of this invention and for the previously noted competitive pressed and bonded AZS refractory (designated Sample X). Typical analyses of those glasses are (in wt.%):

| Soda-Lime | Borosilicate |
|---|---|
| 72% SiO$_2$ | 81% SiO$_2$ |
| 14% Na$_2$O+K$_2$O | 13% B$_2$O$_3$ |
| 13% CaO+MgO | 4% Na$_2$O |
| 1% Al$_2$O$_3$ | 2% Al$_2$O$_3$ |

Sample C is a preferred composition for contact with these types of glasses because the glassy phase in the original fusion-cast AZS grain used therein appears converted to mullite in the fired body to a greater degree than in the other samples. The tests and determination of data values for corrosion cut and stoning potential are described in U.S. Pat. Nos. 3,519,447 and 3,632,359. The corrosion ratings are derived from the corrosion cut data by arbitrarily assigning a rating of 100 for Sample C as a control standard and then calculating the rating for Sample X as a test sample as follows:

$$\frac{\text{Corrosion cut of control standard}}{\text{Corrosion cut of test sample}} \times 100 = \text{Corrosion rating of test sample}$$

The test and determination of data values for blistering rating are described in U.S. Pat. No. 3,519,448. The data shows that the fired refractory body according to this invention has a much greater resistance to molten glass corrosion and to releasing stones and blisters into the molten glass.

Table 2

| Test Conditions: | Soda-Lime Glass 1450° C.-3 days | | Borosilicate Glass 1550° C.-6 days | |
|---|---|---|---|---|
| Sample | C | X | C | X |
| Corrosion Cut at Melt Line-mm. | 1.36 | 2.26 | 0.73 | 1.32 |
| Corrosion Rating | 100 | 60 | 100 | 55 |
| Stoning Potential | 1.20 | 2.48 | 0.6 | 0.9 |
| Blister Rating | — | — | 16 | 35 |

Comparative data for corrosion test performance in molten glass of the type used to make wool-type glass fibers (designated Wool Glass) is given in Table 3 for two samples of this invention, a sample of solid fusion-cast AZS-1 refractory and a commercial pressed and bonded chromealumina refractory (designated Sample Y) presently used in contact with such molten glass. A typical analysis of Wool Glass is (in wt.%): 59% SiO$_2$, 16% CaO, 11% Na$_2$O, 5.5% MgO, 4.5% Al$_2$O$_3$, 3.5% B$_2$O$_3$ and 0.5% K$_2$O. A typical analysis of the bonded chrome-alumina refractory is (in wt.%): 81.7% Al$_2$O$_3$, 16.0% Cr$_2$O$_3$, 0.8% P$_2$O$_3$, 0.5% SiO$_2$, 0.5% Fe$_2$O$_3$ and 0.5% Na$_2$O. Based on AZS-1 as an arbitrary standard, Sample G containing chromic oxide shows superior performance to the commercial bonded refractory also containing chromic oxide. Since it is known that similar refractories containing chromic oxide commonly perform better with molten wool glass than those without chromic oxide, it is not surprising that Sample C exhibits poor corrosion resistance to molten wool glass.

Table 3

Test Conditions; Wool Glass-1450° C.-3 days

| Sample | Corrosion Rating (at Melt Line) |
| --- | --- |
| AZS-1 | 100 |
| G | 129 |
| C | 0 (cut off) |
| Y | 64 |

A fired article according to this invention can also be provided with good resistance to molten wool glass corrosion by employing grain of fusion-cast AZS refractory containing $Cr_2O_3$. For example, a fusion-cast refractory of the following oxide analysis may be so employed to modify samples of this invention not otherwise containing chromic oxide: 28.3 wt.% $Al_2O_3$, 28.0% $Cr_2O_3$, 28.0 wt.% $ZrO_2$, 14.6 wt.% $SiO_2$ and 1.1 wt.% $Na_2O$ (not including minor impurities present up to 0.3 wt.%).

By means of a static alkali resistance test, samples of this invention have been found to exhibit superior resistance ratings such as to indicate their good capability of longer service life as superstructure refractories in glass melting furnaces and other similar applications. Samples were prepared by core drilling a one inch diameter hole to a depth of two inches in fired cube samples with faces 3 inches wide to form a crucible. Thirty grams of $Na_2CO_3$ were placed within those crucible samples, each of which are then covered with a piece of the same fired refractory. Each test assembly is heat to 1500° C. and held there for 7 days, after which it is cooled and cut vertically in half for examination and rating on an arbitrary performance scale ranging from 1 (no visible attack) to 10 (extreme exfoliation, cracking and dissolution of sample surface contacted by melted sodium carbonate to a depth of at least 3/16 - ¼ inch). Table 4 shows comparative ratings illustrating the superior performance of pressed and fired refractories according to this invention.

Table 4

| Sample | Alkali Resistance Rating |
| --- | --- |
| F | 1 |
| C | 7 |
| X | 10 |

EXAMPLE 2

A series of cast and fired refractory samples were prepared by compositions as described in Table 5. Each refractory composition was mixed with an ethyl silicate binder (7 wt.% in Samples H, I, K, L, M and O and 8 wt.% in Sample N) and 0.2 wt.% of triethanolamine as a reaction or gelling catalyst for the ethyl silicate binder. The ethyl silicate binder was reported by the manufacturer to contain 40.5-42.5 wt.% $SiO_2$ in the clear water-white liquid having a specific gravity at 20° C. of 1.050-1.080, maximum free ethanol of 1.5 wt.%, acidity as HCl of $\leq$ 0.01 wt.%, density of 7.9 lbs./gal., freezing point of below −57° C. and a flash point of 12.8° C. Each mixture was then vibratory cast by known conventional techniques into a mold to form the desired shape. After gelling of the binder and removal from the mold, the cast shape was dried at about 93° C. or somewhat higher for approximately eight hours or so. Thereafter the green dried shape was fired to 1550°-1660° C. for at least four hours.

It is to be understood that colloidal silica binder can be provided by sources other than as the residue of ethyl silicate binder. Any suitable alkyl silicate, silica sol or colloidal silica solution (or suspension) may be utilized. Desirably these colloidal silica binders will be in amounts to provide 2-7 wt.% $SiO_2$ residue in the refractory composition of this invention. Additionally, known alternative reaction or gelling catalysts may be employed with suitable gellable alkyl silicates.

The compositions in Table 5 may also be pressed into refractory articles if desired.

TABLE 5

| Refractory Composition Component | Sample Composition - Wt. % | | | | | | |
| --- | --- | --- | --- | --- | --- | --- | --- |
| | H | I | K | L | M | N | O |
| Coarse AZS-1 grain | 33 | — | 33 | 37 | 33 | 33 | 33 |
| Medium AZS-1 grain | 37 | — | 32 | 33 | 37 | 37 | 37 |
| Fine AZS-1 grain | 15 | — | 25 | — | 15 | 15 | 15 |
| Alumina | 15 | 15 | 10 | 30 | 10 | 5 | 15* |
| Chromic Oxide | — | — | — | — | 5 | 10 | — |
| Coarse AZS-2 grain | — | 33 | — | — | — | — | — |
| Medium AZS-2 grain | — | 37 | — | — | — | — | — |
| Fine AZS-2 grain | — | 15 | — | — | — | — | — |
| (*A-2 alumina instead A-10 alumina as in other samples) | | | | | | | |
| 1600° C. Fired Properties | | | | | | | |
| Apparent Porosity - vol. % | 21.3 | 21 | 19.6 | 23.5 | 22 | 24 | 23 |
| Bulk Density - lbs/ft.³ | 185 | 188.5 | 183 | 182 | 186 | 182 | 183 |
| MOR at Room Temp. - psi. | 4450 | 3700 | 4100 | 3550 | 3400 | 3000 | 4000 |
| MOR at 1340° C. - psi. | 1000 | 1000 | 1500 | 1350 | 200 | 500 | 1100 |
| Thermal Shock Cycles - Room Temp. to 1400° C. to Room Temp. | 20+ | 20+ | 20+ | 20+ | 20+ | 20+ | 20+ |
| MOR at Room Temp. after thermal Shock cycles - psi. | 1950 | 850 | 1025 | 2400 | 900 | 1450 | 1600 |

By way of comparison, the following properties were determined for a commercial competitive cast and fired refractory (designated Sample Z hereafter) made with Carbomul® fused AZS grain (produced and sold by the Carborundum Company) believed to be in accordance with U.K. Pat. 1,429,723:

| | |
| --- | --- |
| Apparent Porosity-vol.% | 21 |
| Density-lbs./ft.³ | 180 |
| MOR at Room Temp.-psi | 2050 |
| MOR at 1340° C.-psi | 1000 |
| Thermal Shock Cycles-Room Temp. to 1400° C. to Room Temp. | 20+ |
| MOR at Room Temp. after Thermal Shock Cycling-psi | 1050 |

Carbomul® grain is reported by the manufacturer to have the following typical chemistry and structure:

| | |
| --- | --- |
| $Al_2O_3$ -47.00 wt. % | $Na_2O$ - 0.30 wt. % maximum |
| $ZrO_2$ -36.00 wt. % | $Fe_2O_3$ -0.20 wt. % maximum |
| $SiO_2$ -16.50 wt. % | $TiO_2$ -0.20 wt. % maximum |
| Glassy phase - about 5 wt. % | |
| Crystal phases - Mullite | |

Comparative molten glass corrosion test data is shown in Table 6 for Samples H and Z. The data illustrates the superior corrosion resistance of this invention over prior art rebonded fused AZS grain products.

Table 6

| Test Conditions: | Soda-Lime Glass 1350° C. 2 days | |
| --- | --- | --- |
| Sample: | H | Z |
| Corrosion Cut at Melt Line mm. | 0.24 | 0.48 |
| Corrosion Rating | 100 | 50 |

Samples H and Z were also subjected to the previously described static alkali resistance test. Sample H remained essentially unchanged by the molten sodium carbonate whereas Sample Z exhibited cracking and exfoliation as a result of the alkali attack.

We claim:

1. Refractory composition for making refractory articles consisting of:
   (A) 25–60 wt.% fusion-cast alumina-zirconia-silica refractory coarse grain being at least 89 wt.% −6+20 Tyler mesh,
   (B) 0–38 wt.% fusion-cast alumina-zirconia-silica refractory medium grain being at least 73 wt.% −10+35 Tyler mesh, and
   (C) 30–50 wt.% at least one component selected from the group consisting of
   (1) 0–50 wt.% fusion-cast alumina-zirconia silica refractory fine grain being at least 60 wt.% −35+325 Tyler mesh, and
   (2) 0–30 wt.% at least one constituent selected from the group consisting of
      (a) alumina being at least 90 wt.% −325 Tyler mesh, at least 98.5 wt.% $Al_2O_3$ and not more than 0.5 wt.% $Na_2O$, and
      (b) −325 Tyler mesh chromic oxide being at least 95 wt.% $Cr_2O_3$. the fusion-cast alumina-zirconia-silica refractory having:
         (i) a three-phase microstructure of interlocking crystals of corundum phase and baddeleyite phase with intercrystalline glassy phase therebetween, the glassy phase being about 15–30 vol.% of the alumina-zirconia-silica refractory, and
         (ii) an oxide analysis consisting of 35–60 wt.% $Al_2O_3$ plus $Cr_2O_3$ with $Cr_2O_3 \leq 60$ wt.% of $Al_2O_3$ plus $Cr_2O_3$, 25–50 wt.% $ZrO_2$, 10–18 wt.% $SiO_2$, 0.8–1.8 wt.% $Na_2O$ plus $K_2O$, and up to 0.7 wt.% other ingredients.

2. Refractory composition of claim 1 wherein the fusion-cast AZS refractory has an oxide analysis consisting of 40–55 wt.% $Al_2O_3$ plus $Cr_2O_3$ with $Cr_2O_3 \leq 50$ wt.% of $Al_2O_3$ plus $Cr_2O_3$, 30–45 wt.% $ZrO_2$, 10–16 wt.% $SiO_2$ 1.0–1.6 wt.% $Na_2O + K_2O$, and up to 0.5 wt.% other ingredients.

3. Refractory composition of claim 1 wherein the fusion-cast AZS refractory has an oxide analysis consisting of 40–55 wt.% $Al_2O_3$, 30–45 wt.% $ZrO_2$, 10–16 wt.% $SiO_2$, 1.0–1.6 wt.% $Na_2O$, and up to 0.5 wt.% other ingredients.

4. Refractory composition of claim 1 wherein the fusion-cast AZS refractory has:
   (A) about 20–30 vol.% glassy phase, and
   (B) an oxide analysis consisting of 45–50 wt.% $Al_2O_3$, 33–41 wt.% $ZrO_2$, 12–16 wt.% $SiO_2$, 1.1–1.5 wt.% $Na_2O$ and up to 0.3 wt.% other ingredients.

5. Refractory composition of claim 1 wherein:
   (A) the coarse grain is 33–37 wt.%,
   (B) the medium grain is 20–25 wt.%, and
   (C) the at least one component is 40–45 wt.% selected from the group consisting of
   (1) 15–45 wt.% the fine grain and
   (2) 0–30 wt.% the at least one constituent selected from the group consisting of
      (a) the alumina which is at least 98.5 wt.% $Al_2O_3$ and
      (b) the chromic oxide which is at least 95 wt.% $Cr_2O_3$.

6. Refractory composition of claim 1 wherein:
   (A) the coarse grain is 33–37 wt.%,
   (B) the medium grain is 32–37 wt.%, and
   (C) the at least one component is 30–35 wt.% selected from the group consisting of
   (1) 0–25 wt.% the fine grain and
   (2) 10–30 wt.% the at least one constituent selected from the group consisting of
      (a) the alumina which is at least 98.5 wt.% $Al_2O_3$, and
      (b) the chromic oxide which is at least 95 wt.% $Cr_2O_3$.

7. Fired refractory article having a fourphase microstructure of corundum, badeleyite mullite and glassy phase with the mullite being about 5–25 wt.% thereof and the glassy phase being about 5–20 vol.% thereof, the article being a sintered refractory composition consisting of:
   (A) 25–60 wt.% fusion-cast alumina-zirconia-silica refractory coarse grain being at least 89 wt.% −6+20 Tyler mesh,
   (B) 0–38 wt.% fusion-cast alumina-zirconia-silica refractory medium grain being at least 73 wt.% −10+35 Tyler mesh,
   (C) 30–50 wt.% at least one component selected from the group consisting of
   (1) 0–50 wt.% fusion-cast alumina-zirconia-silica refractory fine grain being at least 60 wt.% −35+325 Tyler mesh, and
   (2) 0–30 wt.% at least one constituent selected from the group consisting of
      (a) alumina being at least 90 wt.% −325 Tyler mesh, at least 98.5 wt.% $Al_2O_3$ and not more than 0.5 wt.% $Na_2O$, and
      (b) −325 Tyler mesh chromic oxide being at least 95 wt.% $Cr_2O_3$, and
   (D) 0–7 wt.% colloidal silica, the fusion-cast alumina-zirconia-silica refractory having:
      (i) a three-phase microstructure of interlocking crystals or corundum phase and baddeleyite phase with intercrystalline glassy phase therebetween, the glassy phase being about 15–30 vol.% of the alumina-zirconia-silica refractory, and
      (ii) an oxide analysis consiting of 35–60 wt.% $Al_2O_3$ plus $Cr_2O_3$ with $Cr_2O_3 \leq 60$ wt.% of $Al_2O_3$ plus $Cr_2O_3$, 25–50 wt.% $ZrO_2$, 10–18 wt.% $SiO_2$, 0.8–1.8 wt.% $Na_2O$ plus $K_2O$, and up to 0.7 wt.% other ingredients.

8. Refractory composition of claim 3 wherein selected constituent alumina is at least 5 wt.% and selected constituent chromic oxide is at least 5 wt.%.

9. Fired refractory article of claim 7 wherein the fusion-cast AZS refractory has an oxide analysis consisting of 40–55 wt.% $Al_2O_3$, 30–45 wt.% $ZrO_2$, 10–16 wt.% $SiO_2$, 1.0–1.6 wt.% $Na_2O$, and up to 0.5 wt.% other ingredients.

10. Fired refractory article of claim 9 wherein selected constituent alumina is at least 5 wt.% and selected constituent chromic oxide is at least 5 wt.%.

* * * * *

UNITED STATES PATENT OFFICE
CERTIFICATE OF CORRECTION

PATENT NO. : 4,119,472
DATED : October 10, 1978
INVENTOR(S) : Otto S. Brashear, Clifford L. Hund, Thomas M. Wehrenberg It is certified that error appears in the above-identified patent and that said Letters Patent are hereby corrected as shown below:

Column 3, lines 22-23, change "corundumtype" to -- corundum-type -- .

Column 3, line 46, change "lest" to -- least -- .

Column 5, line 1, change "Tabler 1" to -- Table 1 -- .

Column 6, line 54, change "chromealumina" to chrome-alumina -- .

Column 9, line 53, change "AZS" to -- alumina-zirconia-silica --.

Column 9, line 59, change "AZS" to -- alumina-zirconia-silica --.

Column 9, line 64, change "AZS" to -- alumina-zirconia-silica --.

Column 10, line 23, change "fourphase" to -- four-phase -- .

Signed and Sealed this

Sixteenth Day of January 1979

[SEAL]

Attest:

RUTH C. MASON
Attesting Officer

DONALD W. BANNER
Commissioner of Patents and Trademarks